(12) United States Patent
Davies

(10) Patent No.: US 6,588,664 B2
(45) Date of Patent: Jul. 8, 2003

(54) NETWORK OF SELF-SERVICE TERMINALS

(75) Inventor: Jeff Davies, Point Frederick (AU)

(73) Assignee: NCR Corporation, Dayton, OH (US)

( * ) Notice: Subject to any disclaimer, the term of this patent is extended or adjusted under 35 U.S.C. 154(b) by 29 days.

(21) Appl. No.: 09/804,174

(22) Filed: Mar. 12, 2001

(65) Prior Publication Data

US 2001/0023893 A1 Sep. 27, 2001

(30) Foreign Application Priority Data

Mar. 16, 2000 (GB) .............................. 0006416

(51) Int. Cl.⁷ .............................................. G06F 7/08
(52) U.S. Cl. .................................. 235/462.01; 235/381
(58) Field of Search ............................. 235/462.01, 375, 235/379, 380, 381, 383, 385; 705/5, 35, 43

(56) References Cited

U.S. PATENT DOCUMENTS

| | | | |
|---|---|---|---|
| 5,025,139 A | | 6/1991 | Halliburton, Jr. |
| 5,239,480 A | | 8/1993 | Huegel |
| 5,408,417 A | * | 4/1995 | Wilder .................. 364/479 |
| 5,598,477 A | | 1/1997 | Berson |
| 5,619,558 A | * | 4/1997 | Jheeta .................. 235/379 |
| 5,724,520 A | * | 3/1998 | Goheen ................ 395/205 |
| 6,308,887 B1 | * | 10/2001 | Korman et al. ....... 235/379 |

FOREIGN PATENT DOCUMENTS

| | | |
|---|---|---|
| WO | 9416781 | 8/1994 |
| WO | 9427258 | 11/1994 |
| WO | 9717680 | 5/1997 |

* cited by examiner

Primary Examiner—Daniel St. Cyr
(74) Attorney, Agent, or Firm—Priest & Goldstein PLLC

(57) ABSTRACT

There is provided a network of self-service terminals, in the form of Automated Teller Machines (ATMs): the ATMs comprising a printer and a means for communicating with a remote database. The printer is arranged to print first information onto a token, which includes a unique bar code. The remote database contains second information regarding the purchase of each token.

1 Claim, 7 Drawing Sheets

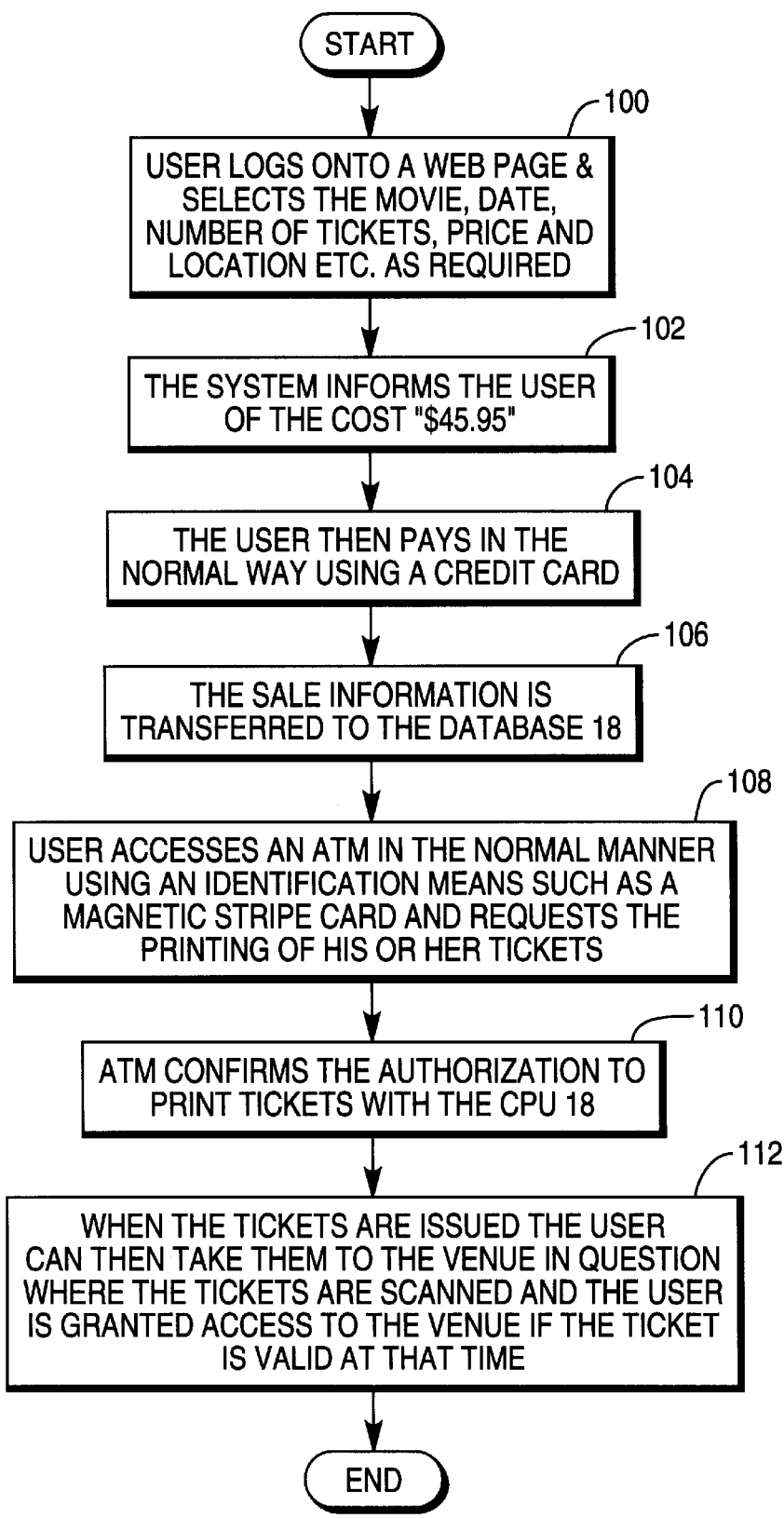

NETWORK OF SELF-SERVICE TERMINALS

BACKGROUND OF THE INVENTION

The present invention relates to a network of self-service terminals and in particular to a network of automated teller machines (ATMs).

ATMs have been utilized traditionally by financial institutions, such as banks or building societies, to provide an access channel through which customers can obtain cash. With time ATMs have been developed that provide additional financial services for customers, such as enabling a user to request account statements or personal check books and allowing customers to see account balances online.

ATMs are generally associated with an individual financial institution and form a network of ATMs accessible by the customers of that financial institution. In order to increase customer convenience most, if not all, financial institutions have opened up their ATM networks to each other's customers, allowing those customers to obtain cash from a larger number of ATMs.

An area of growth for ATMs is in ATMs operated by retail outlets for the convenience of their customers. Those retail outlets that provide this service make an additional income by from charging for the use of this service. Consequently, ATMs may now be found in small retail outlets, such as petrol stations, nightclubs, pubs or corner convenience stores. These ATMs provide ATM services accessible to customers of any financial institutions recognized by the ATM. Commonly these ATMs are, so called, entry level ATMs which provide only minimal services, such as cash dispensing.

Another possible area of growth for ATMs is the area of transaction fulfillment. This is a change in paradigm whereby the ATM fulfills the transaction, (i.e. delivers the end result of a transaction that may have been initiated elsewhere), rather than merely providing information.

An example of this is the NCR Movieline system in Australia, whereby customers can book cinema tickets for any movie, at any of 50 different cinemas, pay for them over the phone by credit card, then use the same card at an ATM (managed by the Movieline system) in the foyer of the cinema to obtain their tickets. This is possible because the ATM immediately recognizes that the user has tickets waiting and prints them out upon demand. Of course, the user can also obtain cash, from the ATM, at the same time.

There is one problem however, a simple paper receipt is printed, generally on thermal paper, with no way of uniquely identifying each ticket, and thus the ticket issuing is not secure. Although this may be acceptable for a small private network, like Movieline, it will hinder its acceptance by the larger ticket issuing community, especially where the ticket itself can have high value, or whereby large volumes of low value tickets might exist.

The prior art solution to the problem of security in respect of event tickets is the use of specialized media stock. That is, the use of specialized card or paper, for example, with a watermark or other security feature, which is specific to the specialized media stock. However, this approach is expensive, as the stock must be printed in relatively short runs, which are different for each event. Also, this approach is not cost effective for use in association with an ATM, as the stock is required to be stored in one of the ATM media canisters used to hold media such as currency. Thus if different event tickets were to be issued by the ATM, the number of available canisters would quickly be exhausted. Alternatively a separate, secure cabinet could be attached to an ATM where the ticket media is held and dispensed separately from the normal ATM functions but under the control of the ATM. This has also been done previously and is expensive.

SUMMARY OF THE INVENTION

Consequently, it is an object of the present invention to provide a network of ATMs that can provide secure printed media for users, without the need for additional specialized hardware at the ATM site.

According to a first aspect of the present invention there is provided a network of self-service terminals: the terminals comprising a printer and a means for communicating with a remote database, the printer being arranged to print first information onto a token, said first information including a unique bar code; and said remote database containing second information regarding the purchase of each token.

The token could be purchased either directly at the terminal, or via some other separate system, whereby the terminal in the latter case is used to complete the transaction by the issue of the token.

Throughout the specification the term token is intended to mean any ticket, voucher or slip which is intended to be redeemed for goods or services, by the purchaser thereof.

Preferably, the self-service terminals are Automated Teller Machines (ATMs).

Preferably, the printer is also arranged to print receipts for customers who use the ATM to withdraw cash.

More preferably, the printer is arranged to print said tokens on paper from the receipt paper roll.

Most preferably, the second information includes the time and date of purchase of the token and the credit card details of the purchaser.

Preferably, upon redemption of a token for goods or services, the information in the database is updated to include the location and time of said redemption.

Preferably, the network comprises one or more bar code scanners. Most preferably, the scanners are wireless application protocol (WAP) enabled hand held scanners.

Preferably, the scanners are located at the entrances to a venue and arranged to read the bar codes on the printed tokens and allow access to users with a valid token.

Preferably, tokens are verified by reference to the information in said database prior to redemption.

Preferably, local servers are associated with the venue for which access is required, such that specific information can be downloaded to the local servers from the remote database, in order to increase the speed of processing of individual tokens.

Preferably, the database also stores data regarding the number of times a token is scanned.

Most preferably, the database also stores data regarding the time interval between each scanning of the token.

Preferably, a token is invalidated in the database after the bar code has been scanned a predetermined number of times.

For example, some tokens will be intended to be single-use tokens, and others will be intended to be multi-use tokens as determined by their purpose.

Preferably, the tokens are invalidated on theft or loss by the purchaser.

Preferably, the terminals comprise a token format memory, which contains data on the format of tokens to be printed by the terminal.

Preferably, the bar code is randomly generated.

Preferably, the terminal comprises a CPU, which generates the bar code.

According to a second aspect of the present invention there is provided a self-service terminal, comprising a printer and means for communicating with a remote database, the printer being arranged to print information onto a token including a unique bar code.

Preferably, the self-service terminal is an Automated Teller Machine.

Preferably, the printer is also arranged to print receipts for customers who use the ATM to withdraw cash.

Preferably, the printer is arranged to print said tokens on paper from the receipt paper roll.

Preferably, tokens are verified by reference to the information in a remote database prior to redemption.

Preferably, the terminal comprises a token format memory, which contains data on the format of tokens to be printed by the terminal.

Preferably, the terminal is arranged to randomly generate the bar code.

According to a third aspect of the present invention there is provided a method of issuing tokens utilizing a network of self-service terminals: comprising a printer and a means for communicating with a remote database, the method including:

a) a purchaser indicating one or more tokens, for future exchange for goods or services, through either an terminal or an alternate user interface;

b) the information regarding the purchase being transmitted to an issuing terminal within the network;

c) said issuing terminal printing first information onto a token including a unique bar code; and d) said remote database storing second information regarding the purchase of the token, for future validation of the token prior to redemption.

Preferably, said self-service terminals are Automated teller Machines.

Preferably, the tokens are printed by the terminal receipt printer, on paper from the receipt paper roll.

Preferably, said second information includes the time and date of purchase of the token and the credit card details of the purchaser.

Preferably, upon redemption of a token for goods or services the information in the database is updated to include the location and time of said redemption.

Preferably, the database also stores data regarding the number of times the token is scanned and the time interval between each scanning of the token.

Preferably, when the token is for use in a public transport system the time between uses of the token is determined, and compared to the normal expected duration of the journey, so as to ensure only one copy of the token is in use at any one time.

Preferably, a token is invalidated in the database after the bar code has been scanned a predetermined number of times.

However, some tokens will be intended to be single-use tokens, and others will be intended to be multi-use tokens as determined by their purpose.

Preferably, the tokens are invalidated on theft or loss by the purchaser.

Preferably, bar code scanners are located at the entrances to a venue, said scanners being arranged to read the printed tokens, access to the venue being allowed to users with a valid token.

Preferably, tokens are verified by reference to the information in said database prior to redemption.

Preferably, information relative to a specific venue or event is downloaded to local servers associated with that venue or event, in order to increase the speed of processing of individual tokens.

Preferably, data on the format of tokens to be printed by the terminal is stored in a token format memory in the terminal.

According to a fourth aspect of the present invention there is provided a propagation signal from a remote database to a self-service terminal, including an instruction to print a security code on a token, in the form of a bar code, the code corresponding to a data entry in a remote database including information regarding the purchase of the token being printed.

According to a fifth aspect of the present invention there is provided a computer readable medium having stored thereon instructions for causing a processor to execute a method of issuing tokens utilizing a network of self-service terminals: the terminals comprising a printer and a means for communicating with a remote database, the method including:

a) Receiving an indication from a purchaser of the number of tokens required, for future exchange for goods or services, from either a self-service terminal or an alternate user interface;

b) Transmitting the information regarding the purchase to an issuing terminal within the network;

c) said issuing terminal printing first information onto a token including a unique bar code; and d) said remote database storing second information regarding the purchase of the token, for future validation of the token prior to redemption.

BRIEF DESCRIPTION OF THE DRAWINGS

Embodiments of the present invention will now be described, by way of example, with reference to the accompanying drawings, in which:

FIG. 5 is a flow diagram illustrating a method of operation of the network of FIG. 2.

DETAILED DESCRIPTION

Figure 1:
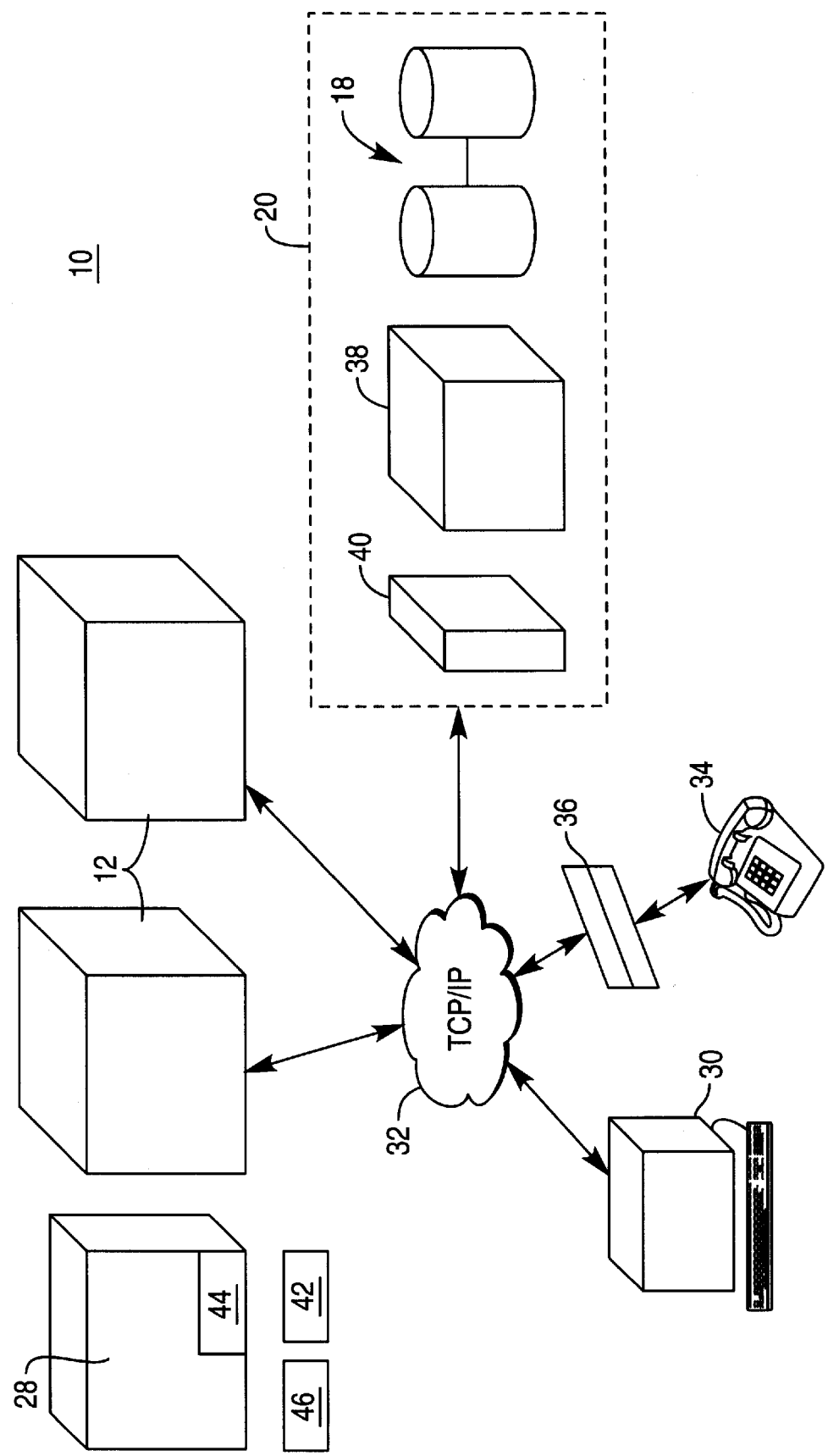
FIG. 1 is a schematic diagram of an ATM in accordance with the present invention.

Referring to FIG. 1, there is illustrated a network 10 of Automated Teller Machines (ATMs) 12. The ATMs 12 comprise a printer 14 and a means 16 for communicating with a remote database 18, as can be seen more clearly in FIG. 2. The database 18 is located at a site 20 remote from the ATMs 12 in the network 10.

Figure 4A:
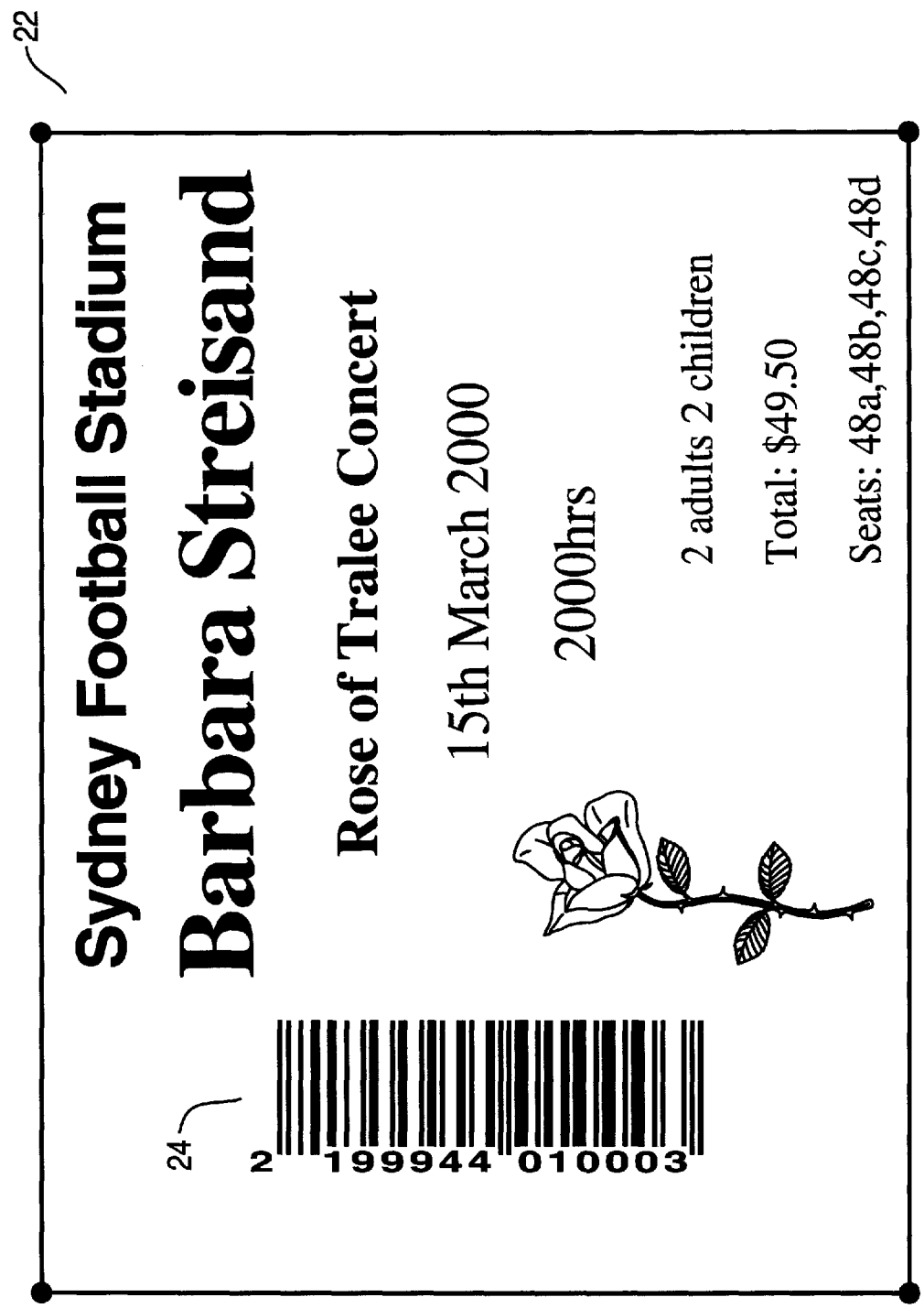
FIGS. 4A, 4B & 4C are three representations of a token in accordance with the present invention.
Figure 4B:
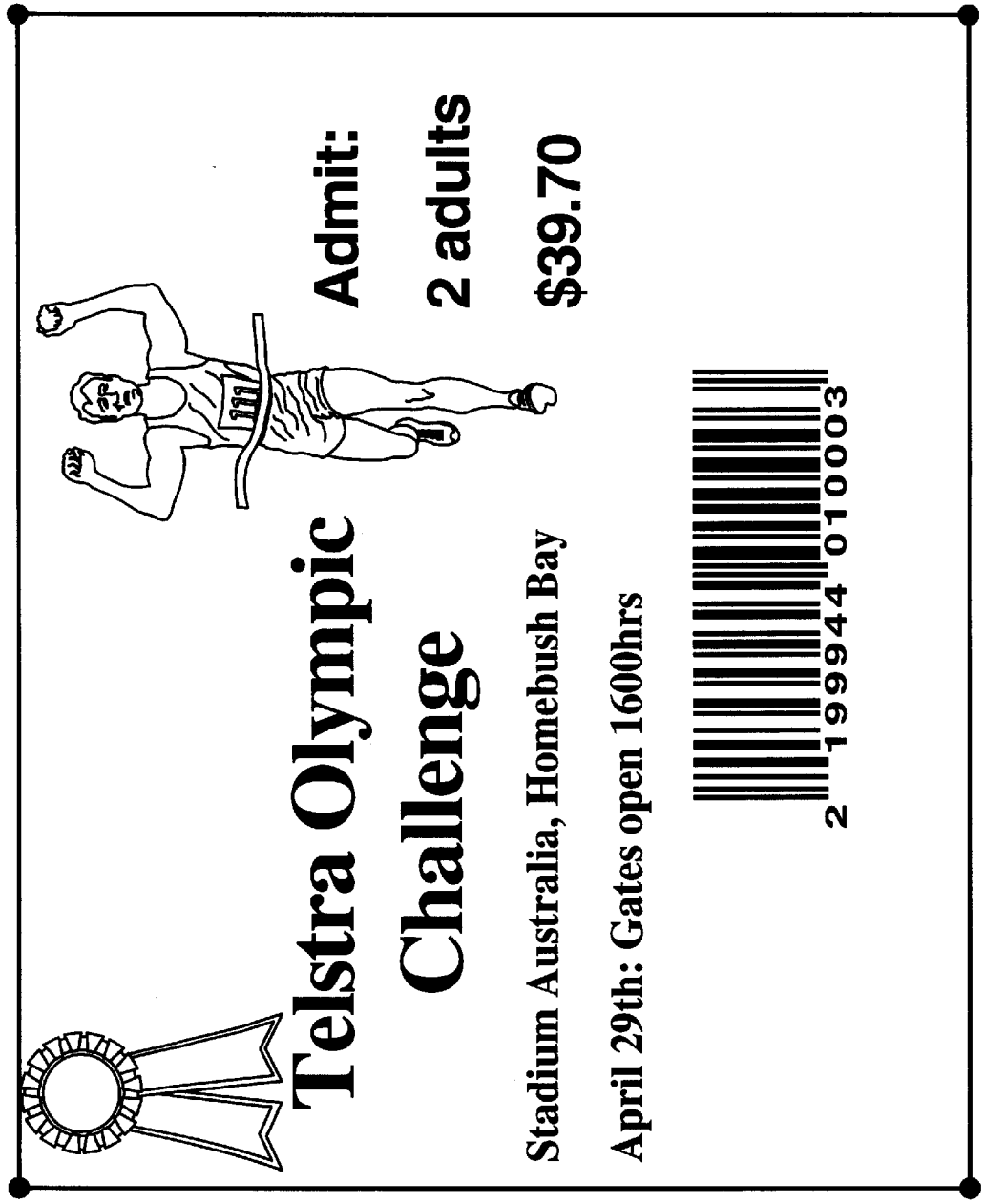
Figure 4C:
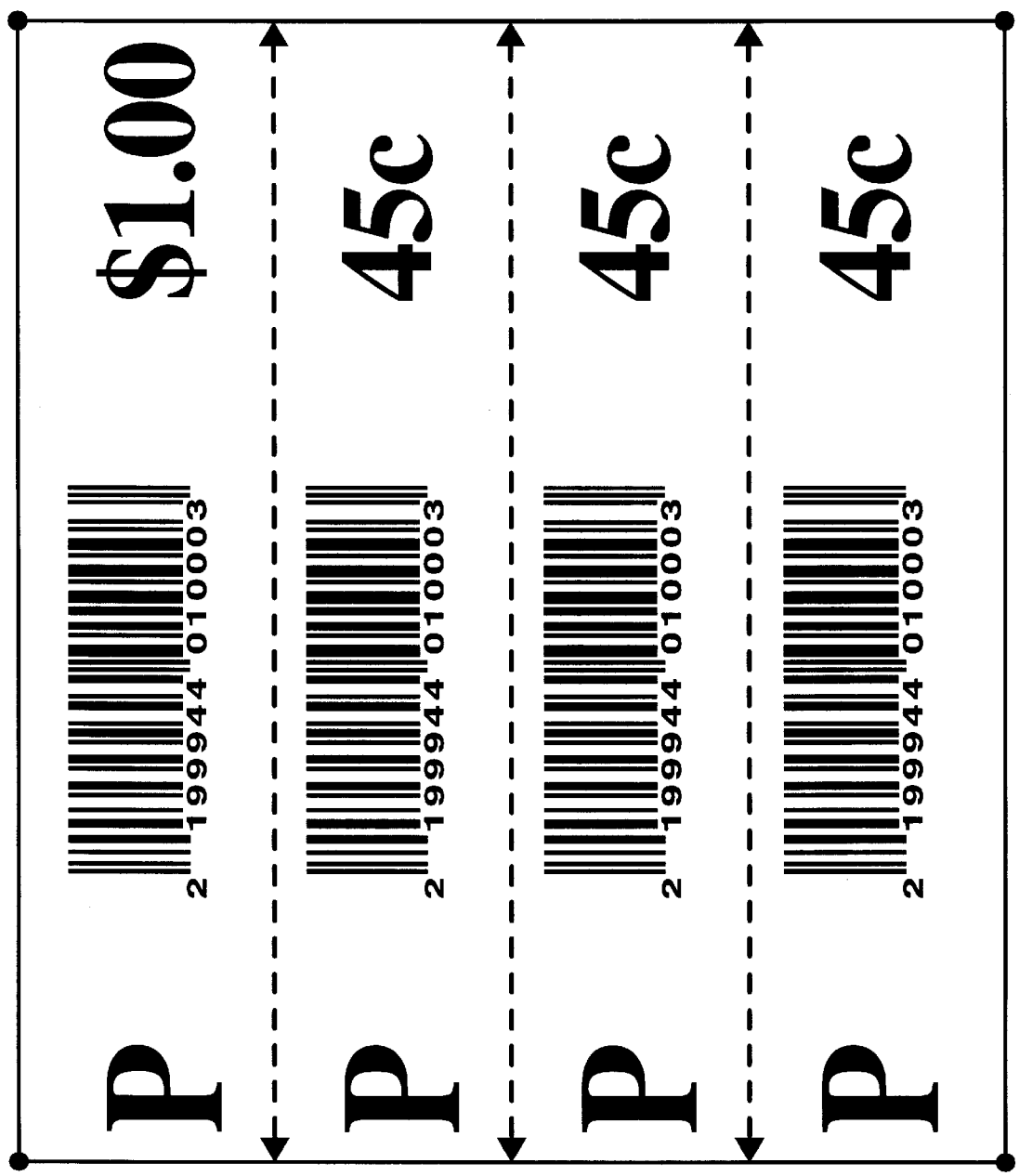

The printer 14 is arranged to print first information onto a token 22 including a unique bar code 24 (FIG. 4). The remote database 18 contains second information regarding the purchase of each token, as will be described in detail below.

The printer 14 is the standard receipt printer normally utilized by the ATM 12, when dispensing cash, to provide a user with a printed receipt of the transaction. The token 22 is, therefore, printed on paper from the receipt paper roll 26.

The purchaser can input a request for the purchase of a token, for example, for access to a concert at a particular venue 28, by a number of different means. As seen in FIG. 1, the user may access the network 10 through a PC 30, which is connected to the network 10 through a TCP/IP protocol network 32. Alternatively, the user may access the network 10 trough a telephone 34, which is connected to the network through a POTS gateway 36. On accessing the network 10, the user's request is directed to a CPU 38, which is connected to the database 18. The CPU is also coupled to a communications server 40, through which the CPU 38 transmits a request to the body issuing tickets for the venue. If the CPU is informed that suitable tickets are available, the user is informed and the purchase is agreed.

Alternatively, the user may request tickets directly from another party. Once the other party approves the sale of the tickets to the user, the user requests that the tickets be issued through an ATM 12 in the network 10. At this time the information regarding the sale is forwarded, by the other party, e.g. a Cinema chain, to the database 18 through the server 40.

This information includes, at least, the time and date of purchase of the token and the credit card details of the purchaser.

Additionally, the information may also include one or more of the following:
Purchase receipt number
Event ticket (token) number(s) (i.e. the s/n of the ticket (token) for that event)
Number of adults
Number of children
Seat number(s),
Date of event
Name of event
Location of event
Date/time of event
Session number (if relevant)
Promoter
Ticket (token) issuer
Ticket (token) design number (ID)
The ticket (token) random serial number (to be converted into a bar code at the ATM)
ID of the ATM that issues the tickets (tokens)
Date and time of ticket (token) issue Additionally, upon redemption of a token for goods or services, the information in the database is updated to include the location and time of said redemption.

As can be seen from FIG. 1, the network 10 also includes one or more, bar code scanners 42, some of which are WAP enabled hand-held scanners 42.

When tickets are being issued for specific events at the venue 28, the scanners 42 are located at the entrances 44 to the venue 28 and arranged to read the bar codes 24 on the printed tokens 22. Access is then allowed only to users with a valid token. The scanners 42 may be connected to toll barriers (not shown) or individual security staff may control access to the event.

The deployment of scanners, particularly hand-held scanners, can also be managed by the system. For example, the database, of course, monitors how many barcode tickets have been sold for any one event and depending on the event it may result in a requirement for, say, a single bar code scanner (in addition to whatever existing entry control mechanism they have (e.g. turnstiles etc.).

In this case, an extra field could be set up on the token so that the ticket clearly states, for example,
"Entry at Gate No. 6 ONLY".

This way the token holders know exactly where to go to have their tickets redeemed.

Also, people who use this form of ticketing can all be sent to one or more gates arranged to accommodate them while other people attending the venue could be sent to other gates. This would also minimize the cost for venues in setting up the scanners.

As more and more tickets are sold, the venue operator (via some kind of update from the central data base) knows how many bar code tickets are in circulation and may decide that he or she actually now requires two or more bar code scanners, at gate 6. Arrangements for the deployment of those scanners can then be made prior to the event. If still more tickets are printed in this way, the operator may actually decide that he or she needs to put bar code scanners on additional gates. In this case, the tickets may be printed with instructions to attend a specific additional gate only. Obviously this could be gate 6 and 7 and then change to 8 and 9 etc. The system can be programmed such that this is an automatic field data change programmed into the central data base (i.e. when the tickets issued exceeds 1,000 change from the entry gate field data from 6 to 7 and so on).

Local servers 46 associated with the venue 28 are utilized for controlling access, for example, to a large event. In this case specific information is downloaded to the local servers 46 from the remote database 18, in order to increase the speed of processing of individual tokens 22. This also reduces the communications bandwidth requirements as a large number of inquiries can be dealt with locally instead of having to be sent to the CPU 38.

This increase in speed is particularly useful as it makes the invalidation of a token 22 in the database 18, after the bar code has been scanned a predetermined number of times, easier. For example, if the token is intended to allow a single user access to a venue, then the token can be invalidated after being scanned once. However, if the token is intended to allow four people access to the venue, then the token can be invalidated after being scanned four times. Thus the prompt invalidation of the token prevents the use of the token to allow access to the venue for unauthorized users.

The tokens can also be invalidated on theft or lose by the purchaser, if, for example, the purchaser contacts the network controller with his or her credit card details and details of the token to be invalidated. If necessary a replacement token can then be printed by an ATM 12 in the network 10.

Figure 2:
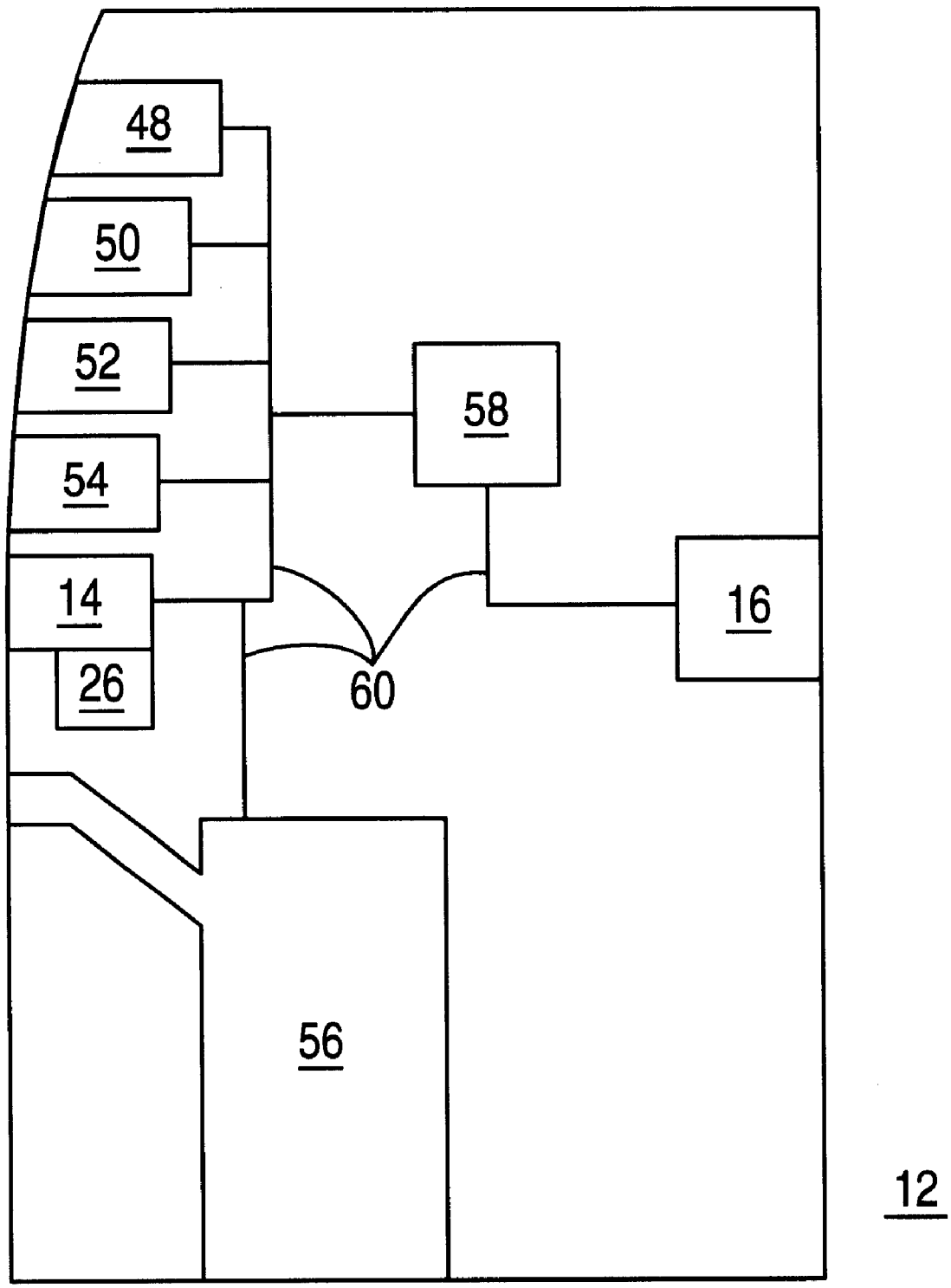
FIG. 2 is a schematic representation of a network of ATMs of FIG. 1.

As can be seen more clearly in FIG. 2, each of the ATMs 12 comprise a token format memory 48, which contains data on the format of tokens to be printed by the ATM 12. This also reduces communications bandwidth, as the CPU 38 only has to transmit this information to the ATMs 12 once (at a convenient time). Thereafter, the information which is sent to an ATM 12 in order to print a token is simply the information which is unique to that token. For example, this could include the random bar code number, the amount paid, the number of adults and children, and the seat numbers.

The ticket design is set-up into pre-determined fields, and only the aforementioned information, which goes into, say, field 1, field 2, field 3 etc needs to be down-loaded to the ATM when the ticket is issued. For example, field 1 might always be the ticket design ID, field 2 might always be the random bar code number, field 3 might be the number of adults, field 4 might be the number of children, field 5 might be the seat numbers, and field 6 might be the total price paid.

When the cardholder inserts his or her card (not shown) into the ATM the ATM checks a central register and asks,
"Are there any tokens for this card-holder?"
The central system tells the ATM 12 that yes there are tokens waiting and the ATM 12 asks the cardholder if he or she wants to print the tickets now. If the user says yes the ATM 12 asks the central system for the data and the relevant data fields, as explained above, are sent down in sequence. The ATM 12 recalls the appropriate design from its memory 48 where the format is cached, and generates the bar code 24 to be printed onto the token 22.

The ATM 12 can also provide the user with a full range of financial services as expected from an ATM.

Turning now to FIG. 2, the ATM 12 of FIG. 1 is illustrated in more detail In addition to the features mentioned above, the ATM 12 includes a display module 50 and encrypting keypad module 52, a magnetic card reader/writer (MCRW) module 54, a cash dispenser module 56, an ATM central processor (CPU) module 58 for controlling the operations of various modules and a network connection module 16 for communication with the server 40 through the TCP/IP network 32. A proprietary internal bus 60 interconnects all of the modules within the ATM 12. The magnetic card reader/writer module 54 forms a means for verifying a user's authorization and display module 50 includes a display 62 (FIG. 3), for the presentation of information to users.

Figure 3:
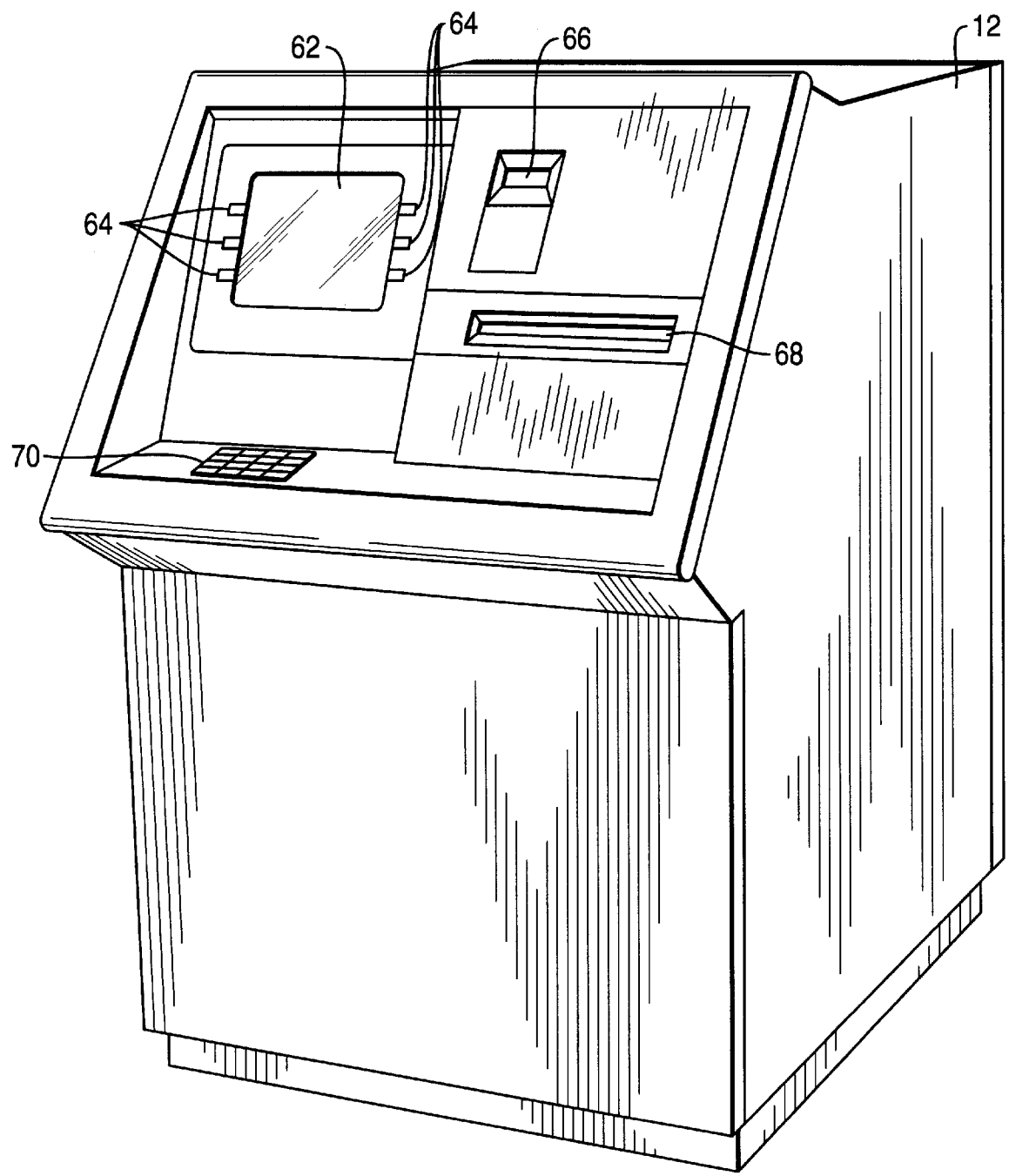
FIG. 3 illustrates the user interface of the ATM of FIG. 2.

FIG. 3 illustrates the user interface of an ATM 12 in accordance with the present invention. The ATM 12 is a standard ATM with a display 62, including FDK keys 64, a card receiving slot 66, a cash dispensing slot 68, and an encrypting keypad 70.

FIG. 5 illustrates use of a network in accordance with the present invention to allow a user to obtain tickets for a cinema. The booking system utilized is web-enabled, whereby, from any public web access device 30, a user can select a cinema web page and from there click on the cinema of his or her choice, the date he or she wishes to go, the film chosen, the session requested, and how many adults and children under 12 are accompanying the user (Box 100).

In accordance with this embodiment, the user is also able to select individual seats if the cinema utilizes an allocated seating arrangement.

The system then informs the user of the cost of purchase, for example "$45.95" (Box 102). The user then pays for it in the normal web manner utilizing a credit or debit card (Box 104).

The information regarding the sale, as discussed above, is then transmitted to the database 18 (Box 106).

When a user requires the tokens to be printed, he or she accesses one of the ATMs 12, in the usual manner using an identification means, such as a magnetic stripe card (Box 108). The card in question may be required to be the same card as used by the user when purchasing the token, or may be an associated card. That is the database 18 may contain a list of each of the cards used by an individual such that the individual may use their credit card to purchase the tokens, but use an "associated" debit card for access to the ATM and printing of the tickets.

Once a request to print the tickets has been entered, by the user, the ATM confirms authorization to print the tickets with the CPU 18, which grants that authorization after interrogating the database 18, to determine if the user is in fact authorized to print those tickets (Box 110).

The user can then take the tickets to the appropriate venue 28, where the token is scanned by a scanner 42, as discussed above (Box 112). If the tickets are valid for the venue at the time of presentation, as determined by the CPU and database 18 or local server 46, then the user is granted access to the venue (Box 114).

In one embodiment, the scanner operator can tell visually if the ticket is being redeemed for the correct purpose, e.g. an Elton John concert ticket for Friday the $_{12}$th of April is not being used for the purpose of gaining entry to a Spice Girls concert on the $_{13}$th of May! Alternatively, additional sophistication may be added, whereby the scanner 42 identifies itself to the authentication database 18, which then checks directly the purpose for which the ticket is being redeemed and returns more details to the scanner via a display screen (not shown), e.g. "Elton John, session 2, Apr. 12, 2000, two adults, three children", etc.

In another embodiment, tokens may be issued, in accordance with the present invention for public transport, such as train transport. One problem with transport tickets is that if the ticket is copied it might be possible for two or more persons to use the ticket simultaneously, i.e. it would be authenticated each time it is presented. Measuring the inter-station gap in time solves this problem. For example, if the ticket were read in "Gosford" at "08:00", it would be impossible for it to be read in "North Sydney" in less than 1 hour, if the journey time is longer than an hour. In other words, if say the ticket is used at "08:15" and again at "08:30", for the same journey, the system would recognize that there was a possible fraud and the ticket holder would be stopped the next time the token is submitted at a terminal or turnstile, and possibly required to show his or her credit card to compare against the original purchase, or some other security process as determined by the transport organization.

Although the invention has been described with particular reference to particular preferred embodiments thereof, variations or modifications may be made without departing from the scope of the present invention For example, for further security, the actual barcode number may be randomly assigned from a list of possible options by the central issuing system (run by NCR). For example, the bar code might have a ten-digit code comprising all combinations of 0 through 9, and A through Z, including both upper and lower case characters and other symbols e.g. AdCg12345A. The system ensures that each random number is issued only once. The bar code number, transmitted to the issuing ATM, is converted into a bar code by the ATM and printed on the token by the thermal receipt printer.

Also, as tickets are redeemed, the central database 18 may be updated immediately so that a copied ticket cannot be similarly authenticated. Using scanners at the event location is much lower cost than having valuable media dispense capability on every ATM. To keep the costs down the scanners might be assigned temporarily in which case handheld wireless technology might be used for certain events only, and then moved to the next event location (e.g. GSM WAP).

What is claimed is:

1. A method for printing a purchased secure token at a self service terminal, the self service terminal having a card reader, a standard receipt printer and central processing unit, the steps comprising:

inserting a financial card into the card reader to provide data about a user; communicating with a remote database to transmit token transaction related data to a remote database and to receive token information including security information from the remote database;

printing the secure token with the standard receipt printer, the central processing unit being further operable to control the printer to print a unique bar code based upon the security information on the secure token;

presenting the secure token to a first bar code scanner located in close proximity to a first venue requiring authorized access;

reading the unique bar code from the secure token, communicating the read bar code information to the remote database;

validating the secure token by comparing the read bar code information against token transaction related data stored in the remote database;

presenting the secure token to a second bar code scanner located in close proximity to a second venue requiring authorized access;

reading the unique bar code from the secure token;

communicating to the remote database the read bar code information and time and location information of token presentment; and authonizing, access to second venue by considering an expected time to travel between first and second venue and the time and location of token presentment.

* * * * *